UNITED STATES PATENT OFFICE.

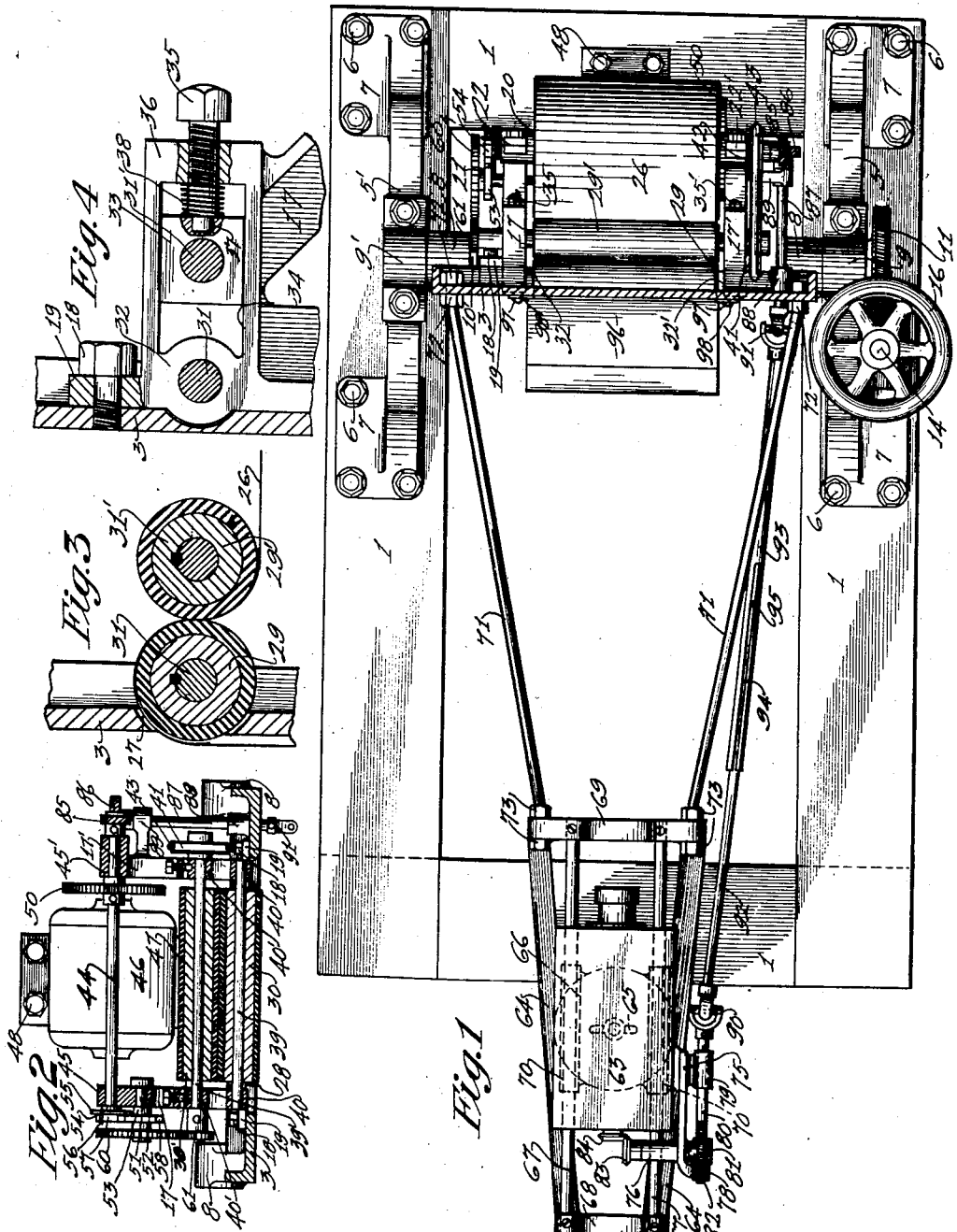

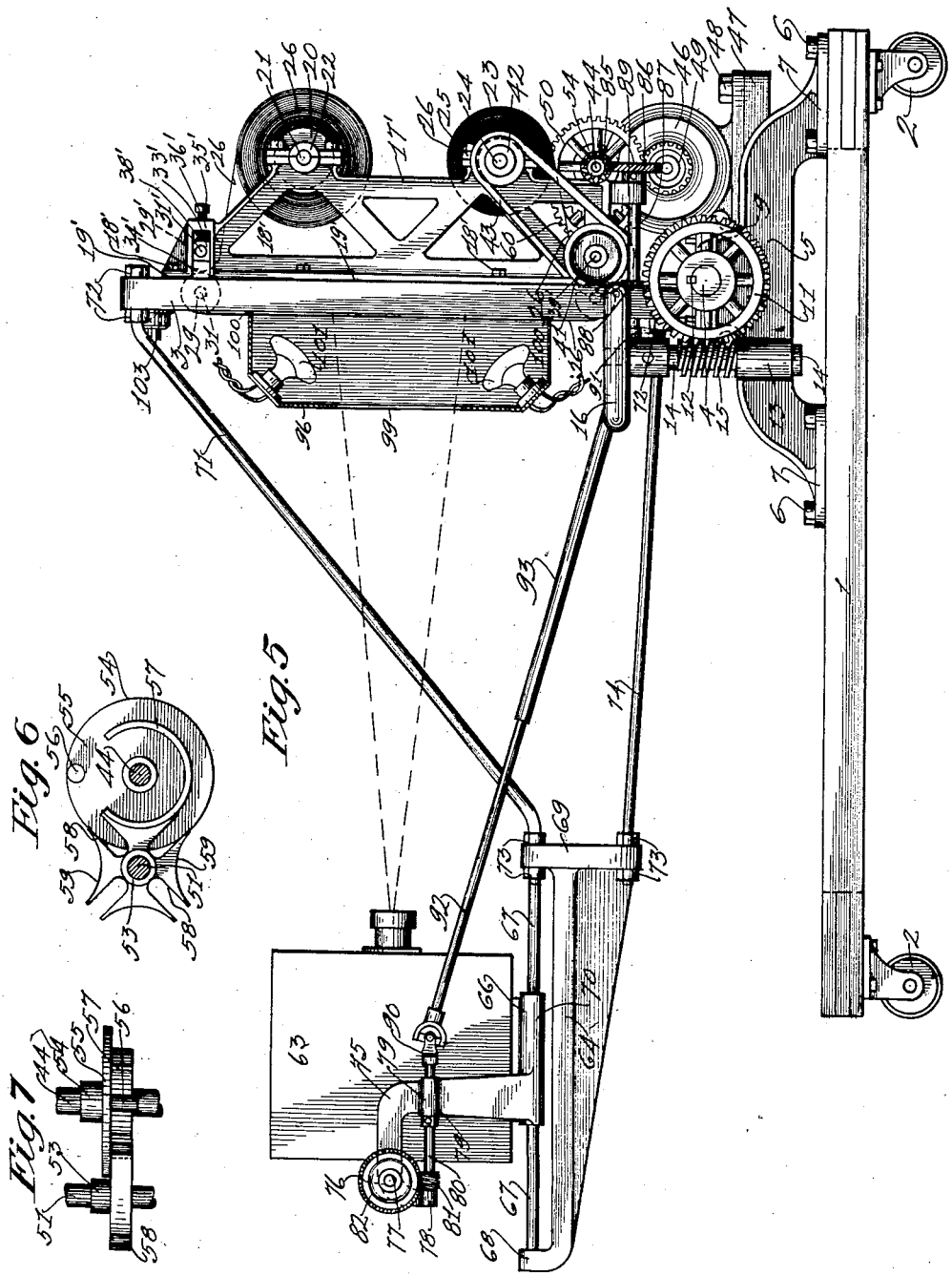

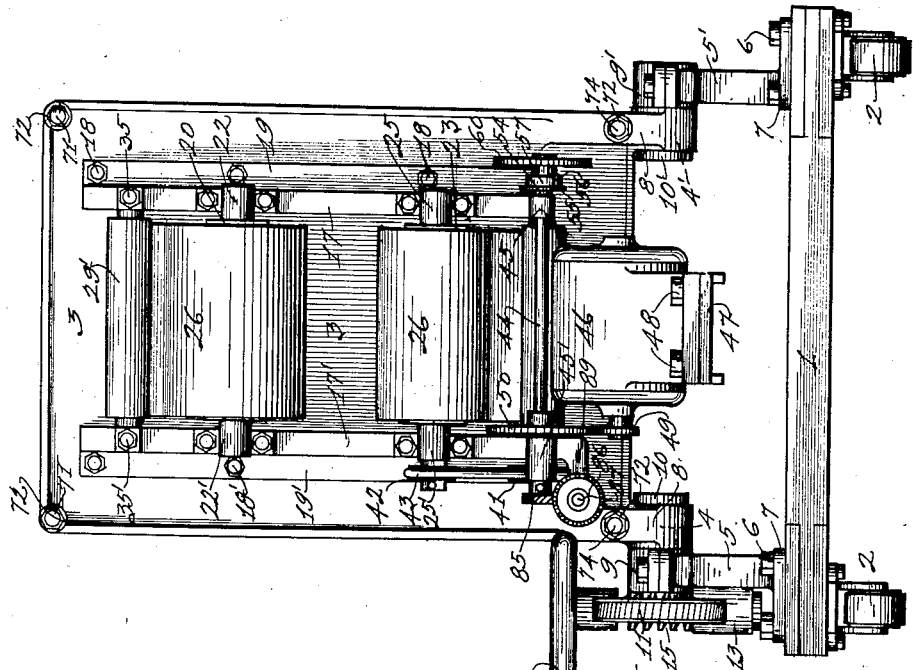

GEORGE J. TEAGUE, OF LOS ANGELES, CALIFORNIA.

MEANS FOR PRODUCING ANIMATED CARTOONS.

1,292,149.     Specification of Letters Patent.     Patented Jan. 21, 1919.

Application filed May 22, 1916. Serial No. 99,155.

*To all whom it may concern:*

Be it known that I, GEORGE J. TEAGUE, a citizen of the United States, residing at Los Angeles, in the county of Los Angeles and State of California, have invented a new and useful Improvement in Means for Producing Animated Cartoons, of which the following is a specification.

My invention relates to animated photography in general and more particularly to means for producing animated cartoons for exhibition purposes, the primary object of my invention being to provide an improved means capable of adjustment and regulation to meet various conditions and capable of operable connection and synchronous action with the ordinary moving picture camera.

A further object is to provide means for supporting the cartoons and matter to be re-produced, in the form of a continuous roll, before the objective of the camera, and for intermittently and successively advancing the pictures on the roll synchronously with the movement of the sensitized film in the camera.

A further object is to provide means for maintaining the alinement of the camera and cartoon roll at all times and for permitting the adjustment of the relative positions of the camera and roll supporting means for the purpose of focusing the camera with the use of lenses of different range, the connecting means between the camera and roll advancing means being arranged for automatic adjustment with the movement of the camera so as to insure and effect the operation of the camera regardless of its relation to the roll.

A further object is to provide means for commonly supporting the camera and roll advancing and supporting means for effecting the simultaneous tilting of both of these elements when such tilting is necessary because of the angle of light, for obtaining the best results.

A further object is to provide a portable base for both the camera and roll supporting means to permit the movement thereof to desired positions. Other objects will appear as the description progresses.

Referring to the drawings, in which similar characters of reference indicate the same parts throughout the several views, Figure 1 is a plan of my improved machine. Fig. 2 is a sectional plan of the roll supporting means and driving means. Fig. 3 is a transverse section of the advancing rollers. Fig. 4 is an elevation of the bearings for the advancing rollers. Fig. 5 is a side elevation of the machine. Fig. 6 is an elevation of the intermittent operating means for the advancing rollers. Fig. 7 is a plan of Fig. 6. Fig. 8 is a front elevation of the machine, and Fig. 9 is a rear elevation of the same.

The entire mechanism is mounted on a base 1 which is composed of longitudinal and transverse members rigidly mortised together at the corners and provided with rubber tired casters 2, so that the machine may be easily moved from place to place. The entire operating mechanism is supported on a vertically disposed face plate 3 which is pivoted at the bottom on each side, by means of trunnions 4 and 4' to the substantially heavy frames 5 and 5' which are secured to the base 1 by means of the bolts 6 extending through the feet 7, the trunnions 4 and 4' being keyed or otherwise suitably secured to the face plate 3 in the lugs 8 thereof, so as to effect the movement of the face plate when the trunnions are turned in the bearings 9 and 9' of the frames 5 and 5'. Both of the trunnions have enlarged heads 10 and 10' on their inner ends, and the trunnion 4 is extended outwardly from the frame 5 and is provided with a worm gear 11 which is also keyed thereto by means of a key 12. A vertical bearing 13 is formed on the frame 5 below the bearing 9, in which is seated a worm shaft 14 carrying a worm 15 above the bearing 13 which meshes with and serves to turn the worm wheel 11, and a hand wheel 16 on the upper end thereof, by means of which the worm and worm gear may be operated for adjusting the inclination of the face plate 3 and the mechanism supported thereon.

A pair of substantially similar frame members 17 and 17' are secured to the rear side of the face plate 3, on opposite sides of the center, by means of bolts or cap screws 18 and 18' extending through the bottom flanges 19 and 19', respectively and these frames serve as supports for the driving and roll advancing means. A delivery roller 20, upon which the cartoon roll is primarily carried, is supported at the rear and in parallel relation with the face plate on a shaft 21 which is journaled in bearings 22 and 22' on the frame members 17 and 17', respectively, and is positioned substantially above the horizontal center line of the face plate. A receiving roller 23, similar to the delivery roller 20, is mounted on a shaft 24 which is journaled in bearings 25 and 25', respectively, on the frame members 17 and 17', and is parallel with and in vertical alinement, preferably, with the roller 20, the receiving roller being equally as far below the center line of the face plate as the roller 20 is above the center line.

The cartoons are drawn on the paper roll 26 which is primarily carried on the delivery roller 20, and when the cartoons are ready for reproduction, the end of the roll on which they are made is extended through a slot 27 in the upper end of the face plate 3 and drawn downwardly over the smooth surface of the front of the plate, thence through a slot 28 near the bottom of the plate, and is wrapped around the receiving roller 23, as shown in Fig. 5, the cartoon roll at both the top and bottom being passed between pairs of rollers 29 and 29' and 30 and 30', which rollers serve to advance the roll 26 from the delivery roller to the receiving roller, as will be hereinafter described.

The upper pair of advancing rollers 29 and 29' are idlers and are supported on parallel shafts 31 and 31', respectively, the front roller 29 of this set being extended through the slot 27 in the face plate so that the periphery thereof is substantially flush with the front face of the plate 3, and the shaft 31 on which this roller is mounted being journaled in bearings 32 and 32' on the opposite frame members 17 and 17', respectively. It will be observed that the forward roller 29 is thus rigidly mounted relative to the face plate and a sufficient clearance between the periphery of the roller and the edge of the slot 27 is provided to insure the free passage of the cartoon roll therebetween.

The rear roller 29' of the upper set is supported on the shaft 31' which is journaled in the adjustable bearings 33 and 33', respectively, on the frame members 17 and 17', as shown in Figs. 4 and 5, the bearings being slidable in elongated recesses 34 and 34', respectively and capable of adjustment by means of adjusting screws 35 and 35' which are threaded into the bosses 36 and 36'. The inner ends of the adjusting screws 35 and 35' are slightly reduced and seat in depressions 37 formed in the outer side of the bearings 33 and 33' and carry springs 38 and 38' which compress between the bearings and the inner sides of the bosses 36 and 36', the contact of the rollers 29 and 29' being thus adjusted to a desired degree by means of the screws which limit the movement of the bearings outwardly and the springs 38 and 38' serving to maintain the rollers in contact with the cartoon roll 26 which is held therebetween, as stated.

The lower set of advancing rollers 30 and 30' are similar in form and character to the upper set 29 and 29', the rollers being supported on shafts 39 and 39', respectively, which are journaled in bearings 40 and 40', respectively, of the frame members 17 and 17', the bearings 40 being rigid and the bearings 40' being adjustable in recesses in the frames after the fashion of the bearings 33 and 33' of the upper set.

It should be understood that while the rollers 29' 30' are adjustable by means of the adjusting screws, the movement of the rollers is so slight because of the almost inappreciable thickness of the paper of the cartoon roll 26, that in operation the alinement of the rollers will at all times be preserved and the outward movement of the rollers is limited by the adjusting screws. These rollers may be widely separated, however, for the purpose of inserting the paper roll therebetween, and this is the principal purpose and function of the adjusting screws and the springs which they carry, the rollers 29, 29', 30, and 30' being preferably provided with resilient tires of rubber or similar substance, for affording a perfect grip on the paper and for permitting the passage of the paper therebetween without normally or necessarily affecting the relative positions of the rollers in the sets.

The shaft 39' on which the roller 30' of the lower set of advancing rollers is mounted, is extended outwardly from the bearing 40' in the frame member 17' and is provided with a grooved sheave 41 which drives a somewhat smaller sheave 42 on the similarly extended end of the shaft 24 of the receiving roller 23 by means of a belt 43 which is preferably a spring belt for the reason that as the roll 26 is rolled up on the roller 23 the speed of the roller 23 should gradually decrease relative to the speed of the driving roller 30' as the diameter of the paper roll thereon increases, for the purpose of insuring an even movement of the paper and for preventing the sagging thereof. A spring belt will permit a slight difference in the movement of the rollers 30' and 23 and in the event that the roller 23 is being rotated too fast the difference may be compensated for by the resiliency of the belt without straining the paper excessively.

A driving shaft 44 is supported horizontally at the rear of the face plate 3 in bearings 45 and 45' on the frame members 17 and 17', respectively and is extended at each end beyond the end of the bearing. A motor 46 is supported on an extension 47 from the face plate 3 and is secured thereto by means of bolts or screws 48, a pinion 49 on the motor shaft meshing with and serving to drive a relatively large gear 50 attached to the drive shaft 44 thereabove.

An idler shaft 51 is supported revolubly in a bearing 52 in the frame member 17 and carries the driven element 53 of the well known Geneva movement which is driven by the driving element 54 attached to the driving shaft 44. This movement, while well known to mechanics, is shown in detail in Figs. 6, and 7 and serves to impart motion intermittently to the advancing rollers of my machine and render the movement thereof positive. The driving element 54 comprises a disk 55 carrying a horizontally extended pin 56 near the periphery thereof and a rim 57 having an opening therein equal to one quarter of its periphery. The driven element 53 comprises a star shaped disk having four slots 58 radiating from the axis at regular intervals for receiving the pin 56 on the element 54 and the peripheral spaces between the slots being formed to fit the periphery of the rim 57 on the disk 55. Thus, when the driving element 54 is rotated, the pin 56 at each revolution enters one of the slots 58 in the driven element, and the pin being central with and opposite the peripheral opening in the rim 57, the points on each side of the slot in which the pin seats, will move into the opening in the rim and the driven element will be rotated exactly one quarter of a revolution. The pin 56 enters the slots 58 at an angle of 45 degrees and emerges at a like angle relative to the vertical center lines of both of the elements of this movement and after each operation of the driven element, the latter is locked against further movement until another complete rotation of the driving element by means of the engagement of the peripheral spaces 59 with the periphery of the rim 57.

For obtaining the best results in operation and the desired speed of the several rollers, I provide a large gear 60 which is attached to the outer end of the idler shaft 51 and meshes with and drives a smaller gear 61 attached to the extended end of the shaft 39' of the roller 30', the diameters of the rollers 29, 29', 30 and 30' and the relative sizes of the gears 60 and 61 being such that each operation of the driven element 53, which is intermittent in movement, will rotate the rollers one complete revolution. The paper roll 26 upon which the cartoons are drawn in squares which are of a size in direct proportion to the picture area of the film squares, is moved by the rollers 29, 30, etc., over the front face of the plate 3 for a distance equal, in proportion, to the movement of the film in the camera, at each revolution of the advancing rollers, and a sufficient length of the paper roll 26 is exposed on the face plate to permit at least three of the exposure areas thereon to be observed at a glance. This arrangement permits the photographing of the central area of the three exposed and the observation, for the purpose of control, of one area above and one below the one being photographed, facilitates the operation of the machine.

The camera 63 is removably supported on a frame 64 at a point substantially distant from the face plate 3, by means of a wing head screw 65 extending through a flange 66, in a manner similar to the method of attaching the ordinary tripods to the camera. The camera frame is elongated sufficiently to permit the longitudinal adjustment of the camera for obtaining the proper focus, and is slidably mounted on longitudinally disposed rods 67 which are secured at opposite ends in the vertical extensions 68 at the rear and 69 at the front, extensions 70 being formed on the flange camera base 66 which are bored to slidably fit the rods.

A pair of inwardly and downwardly deflected rods 71 are attached to the upper corners of the face plate 3 by means of nuts 72 on each side of the plate, and the outer ends of these rods are similarly attached to the front extension 69 of the camera base by means of the nuts 73. A pair of similar but shorter rods 74 are similarly attached to the lower corners of the face plate 3 and the extension 69 at opposite ends by means of the nuts 72 and 73, and the four rods serve to support the camera base on the face plate, so that a movement of the face plate for changing the angle or inclination thereof will also move the camera and support simultaneously therewith, without disturbing the alinement of the elements.

A vertical extension 75 is formed on the camera base 66 which is provided with a transverse bearing 76 in which is journaled a shaft 77 and the lower longitudinal bearings 78 and 79 in which is journaled the longitudinal worm shaft 80. A worm 81 is attached to and driven by the shaft 80 and meshes with and drives a worm gear 82 on the outer end of the shaft 77. The inner end of the shaft 77 carries a bevel gear 83 which meshes with and drives a similar gear 84 attached to the camera operating mechanism in the place of the usual crank. The end of the drive shaft 44 carries a spiral gear 85 which meshes with and drives a spiral gear 86 attached to the longitudinal shaft 87 which is journaled in the bearings 88 on the face plate and 89 on the frame member 17', the shaft 87 operating continuously with the drive shaft. The shafts 80 and 87, on the camera and paper roll supports, respectively, are connected by means of a universal telescoping coupling composed of the universal joints 90 and 91 attached to each of the shafts, the small shaft coupling rod 92 connected with the shaft 80 by means of the joint 90, and the hollow shaft coupling 93 attached to the shaft 87 by means of the joint 91, a slot 94 being provided in the periphery of the shaft 93 to receive a pin 95 attached to the shaft 92. This connection permits the movement of the camera without disturbing the operative relation thereof with the face plate and paper advancing means, and also provides means for mechanically operating the camera. The relative sizes and speeds of the worm gear sets which impart motion to the camera are such that the camera may operate synchronously with the paper advancing means, and there being no belt connections, and consequently no possibility of lost motion or slipping, when the various operating elements are once set up and timed with respect to each other, the producing and reproducing elements of the machine will at all times be capable of uniform and synchronous operation.

It is obvious that by tilting the face plate by the turning of the hand wheel 16, through the medium of the worm 15 and worm wheel 11, the entire machine may be inclined to any desired angle to conform to the angle of the sunlight, and the machine being portable, may be made to face in any desired direction according to the direction of the light rays. In order, however, to provide means for using my machine on dark days, during the night time, or where the sunlight is not accessible or desirable, I provide a metallic hood 96, of rectangular form, on the face of the plate 3 and secured thereto by means of screws 97 extending through the flanges 98 at the sides of the hood. An opening 99 is provided in the front of the hood which is slightly larger than the range of the camera at this point, as indicated in Fig. 5, and slots 100 are also formed at the top and bottom of the hood adjacent to the face of the plate 3 to permit the passage of the paper roll 26 therethrough. The front of the hood is substantially extended from the face of the plate 3 over which the paper roll moves and the upper and lower front corners are beveled and have a row of electric lamps 101 suitably secured thereto and insulated therefrom, the lamps being arranged at angles so as to throw the rays of light directly upon the central picture area of the paper roll. Suitable reflectors or diffusing means may be inserted in the hood behind the lamps if desirable, and the lamps may be connected to the house lighting circuit. I provide and show separate snap switches 102 and 103 for the motor and lamp and another switch 104 for controlling the entire electric supply for the machine, but as ordinary switches and lamps may be used, the arrangement may be changed from that shown to suit varying conditions and requirements.

Heretofore in the reproduction of pictures for making animated cartoons, as far as my knowledge extends, the pictures have been first made on cards and the cards then photographed singly, in succession, and a great deal of time has been necessarily consumed in the production of a single cartoon. In my device means is provided whereby the pictures may be drawn in the several successive postures on the roll 26, and thereafter inserted in the machine, as described, for reproduction. It is obvious that when the pictures are thus drawn, the reproduction with my machine will effect a great saving of time and labor and a great benefit will result to the users of the machine.

Having thus described my invention, what I claim is;

1. An animated cartoon producing machine comprising a portable carriage, a frame tiltably supported on said carriage and having a face plate held thereon, a printing roll of film or paper rotatably supported on one end of said frame, a receiving roll for said paper on the other end of said frame, means for guiding said paper or film from one to the other of said rolls and over said face plate, and means for intermittently actuating and moving said paper, as set forth.

2. An animated cartoon producing machine comprising a portable base provided with tiltable film carrying means and a camera adjustably supported relative thereto, a film feeding roll and a film receiving roll supported in spaced relation for advancing said film before the objective of said camera, a face plate over which said film is adapted to be moved, and a pair of frictional surfaced guide rolls supported on said face plate for moving said film to and holding the same firmly in printing position.

3. An animated cartoon producing machine comprising a tiltable frame having camera supporting means and film supporting means held thereon in spaced relation, film feeding and receiving rolls on said frame, relatively yieldable guide rollers rotatable with the movement of said film, a face plate over which said film is adapted to be moved before the objective of said camera, and a hood attached to said face plate for shielding a portion of said film and provided with means for lighting said shielded portion.

4. An animated cartoon producing machine comprising a portable carriage, a pair of alined base members rigidly supported thereon, a face plate tiltably mounted on said base members, a camera adjustably mounted on and substantially spaced from said face plate, film supporting and advancing means also supported on said face plate, and means for adjusting the inclination of said face plate and said camera simultaneously.

5. An animated cartoon producing machine comprising a base, a tiltably mounted face plate on said base for supporting the film before a camera, camera supporting means adjustably mounted on said face plate, means for simultaneously adjusting the inclination of said face plate and said camera, a driven element mounted on said face plate, driving elements mounted on said face plate for moving said film before said camera and for operating said camera, and means for rendering said film moving element intermittently operative.

6. An animated cartoon machine comprising a base, a face plate tiltably mounted thereon, a camera bracket rigidly attached to and substantially spaced from said face plate, a slide adjustable longitudinally of said bracket, a camera supported thereon, a film supported on said face plate and adapted to be intermittently advanced over the surface thereof before the objective of said camera, and means for actuating said film.

7. An animated cartoon producing machine comprising a base, a face plate tiltably mounted thereon, a driving element supported on said face plate, a film feeding and a film receiving roll also mounted thereon, yieldable guide means for advancing said film over the surface of said face plate, a bracket rigidly supported on and substantially spaced from said face plate, a slide adjustable longitudinally thereof, a camera held on said slide, and means for operably connecting said camera and said film with said driving element for simultaneous operation.

Signed at Los Angeles, in the county of Los Angeles and State of California, this 8th day of May, 1916.

GEORGE J. TEAGUE.

Witnesses:
J. N. TEAGUE,
LUTHER L. MACK.